(12) United States Patent
Takara et al.

(10) Patent No.: US 9,092,171 B2
(45) Date of Patent: Jul. 28, 2015

(54) MANAGEMENT APPARATUS FOR NOTIFYING ERROR MESSAGE AND NOTIFICATION METHOD USING THE SAME

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventors: Syusaku Takara, Shizuoka-ken (JP); Jin Kamada, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/973,084

(22) Filed: Aug. 22, 2013

(65) Prior Publication Data

US 2015/0055164 A1    Feb. 26, 2015

(51) Int. Cl.
| | | |
|---|---|---|
| *G06F 15/00* | (2006.01) | |
| *G06K 1/00* | (2006.01) | |
| *G06F 3/12* | (2006.01) | |
| *G06K 15/00* | (2006.01) | |
| *H04N 1/00* | (2006.01) | |

(52) U.S. Cl.
CPC ............. *G06F 3/1235* (2013.01); *G06F 3/121* (2013.01); *G06F 3/1285* (2013.01); *H04N 1/00244* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 6,985,241 B1 | 1/2006 | Haines et al. | |
| 6,985,877 B1 | 1/2006 | Hayward et al. | |
| 2003/0105995 A1* | 6/2003 | Schroath et al. | 714/48 |
| 2005/0018242 A1* | 1/2005 | Azami | 358/1.15 |
| 2005/0099639 A1* | 5/2005 | Payne et al. | 358/1.1 |
| 2005/0132028 A1* | 6/2005 | Lester et al. | 709/222 |
| 2006/0153613 A1* | 7/2006 | Nemmaier et al. | 400/50 |
| 2008/0270525 A1* | 10/2008 | Thero et al. | 709/203 |
| 2009/0040551 A1* | 2/2009 | Ohara | 358/1.15 |
| 2013/0021641 A1* | 1/2013 | Park et al. | 358/1.14 |
| 2013/0050739 A1* | 2/2013 | Oshima et al. | 358/1.14 |

* cited by examiner

*Primary Examiner* — Ming Hon
(74) *Attorney, Agent, or Firm* — Amin, Turocy & Watson, LLP

(57) ABSTRACT

A management apparatus according to the embodiment comprises a memory, an interface and a control section. If a device determined itself to be in a predefined first state, the interface receives the alert information transmitted from the device. The control section carries out no notice notifying the first state of the device to the external apparatus if a first information representing a state the same as the state represented by alert information is contained in the memory, and stores the first information in the memory based on the alert information and carries out the notice to an external apparatus if the first information is not contained in the memory.

8 Claims, 4 Drawing Sheets

MANAGEMENT APPARATUS FOR NOTIFYING ERROR MESSAGE AND NOTIFICATION METHOD USING THE SAME

FIELD

Embodiments described herein relate to a technology for notifying the state of a device.

BACKGROUND

For example, there is an apparatus which manages a plurality of devices centrally, such as an image forming apparatus and the like. Such a management apparatus inquires of each office device to acquire the state information on the office device. If the state of the office device is not good, the management apparatus carries out a mail transmission concerning the state of the office device to a maintenance server configured externally. The operator of the maintenance server receiving the mail notice carries out the sending arrangement of supplements or the arrangement of a maintainer.

In addition, the office devices include a device which transmits an alert trap to the management apparatus upon in the state that the amount of the rest consumable becomes less or a fault occurs. When receiving the alert trap, the management apparatus transmits a mail to the maintenance server, like does in the aforementioned inquiry.

Even in the case where alerts concerning the same content are not cleared, an office device, when powered on or recovered from a sleep state, transmits mails at given intervals many times.

DETAILED DESCRIPTION

When taking an office device which transmits the same alert for many times as a managed object, the management apparatus transmits all received alerts to the outside as an alert mail conventionally. However, in this case, the management apparatus will transmit a great many of alert mails concerning the same content, which increases the amount in traffic. Further, a maintenance server is needed to or the operator of the maintenance server needs to determine whether or not there are the same unsettled alerts.

The object of the embodiment is to provide a technology for determining whether or not alerts are alerts concerning the same content and preventing the transmitting the same unsettled alerts.

According to the embodiment, a management apparatus comprises a memory, an interface and a control section. If a device determined itself to be in a predefined first state, the interface receives the alert information transmitted from the device. The control section carries out no notice on the first state of the device to an external apparatus if first information representing a state the same as the state represented by the alert information is contained in the memory, and stores the first information in the memory based on the alert information and carries out the notice to the external apparatus if the first information is not contained in the memory.

According to conventional technology of transmitting a mail at the time point when an alert is received, the management apparatus of the embodiments only notifies the external apparatus of an alert once if alerts are alerts concerning the same content.

Figure 1:
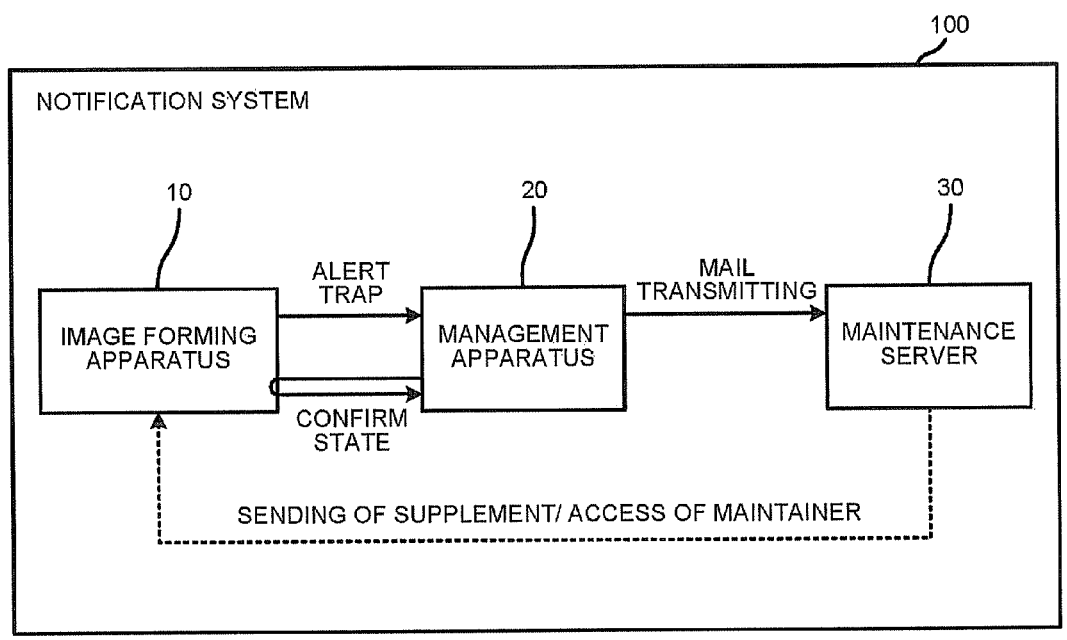
FIG. 1 is a schematic diagram illustrating an example of the configuration of a notification system.

The embodiment is described below with reference to accompanying drawings. FIG. 1 is a schematic diagram illustrating an example of the configuration of a notification system according to the embodiment. The notification system 100 comprises an image forming apparatus 100, a management apparatus 20 and a maintenance server 30. In this example, the image forming apparatus 10 and the management apparatus 20 are connected with each other through an LAN (Local Area Network), and the management apparatus 20 is connected with the maintenance server 30 through a WAN (Wide Area Network). Moreover, in the embodiment, the image forming apparatus 10 and the management apparatus 20 are assumed to be arranged at neighboring positions in the same enterprise. The maintenance server 30 is arranged at a position in a maintenance company physically far away from the image forming apparatus 10 and the management apparatus 20. Besides, there may be more than one image forming apparatus 10. The management apparatus 20 may be of a lengthy configuration. In addition to the image forming apparatus, the management apparatus 20 may further take other office devices as managed objects. Such a office device has an interface section for carrying out the data transmission/reception with the management apparatus 20.

The image forming apparatus 10 is an MFP (Multifunction Peripheral) having functions carrying out copying, printing, scanning and FAX transmission/reception. The image forming apparatus 10 receives a state inquiry telegram from the management apparatus 20 to confirm its own state (the amount of the rest consumable or the occurrence of a fault, etc.) and replies a confirmation result telegram to the management apparatus 20.

Further, the image forming apparatus 10 confirms its own state periodically or when powered on or recovered from a sleep state. If the obtained state is a predefined state (a first state), the image forming apparatus 10 transmits an alert trap (hereinafter referred to as alert) to the management apparatus 20. The alert is transmitted when there is little consumable (e.g. toner) left or a fault occurs. Further, the alert is continuously transmitted to the management apparatus 20 if the state is not released. Besides, the types of faults include: the generating of a paper jam, the running out of sheet and the occurrence of a fault in the internal of the image forming apparatus 10. Further, an alert may be transmitted in the case of a high utilization rate of hardware resources.

The management apparatus 20 carries out a state confirmation inquiry at given intervals. Further, the management apparatus 20 receives an alert when the alert is transmitted from the image forming apparatus 10 and converts the content thereof into data in the form of an email. The management apparatus 20 transmits the email data to the maintenance server 30. In this example, it is set that an email is notified to the outside in the way above, however, an email can be notified according to any protocol or communication unit as long as the data is in the form of telegram data receivable to the maintenance server 30.

When receives an alert, the management apparatus 20 transmits an email only aiming at the initially detected fault or few amount of rest consumable and doesn't carry out the transmission of the email if alerts are transmitted for a plurality of times repeatedly as the fault is unsettled. The specific example of the control is described below.

The maintenance server 30, a computer which at least comprises a processor and a memory and is installed with the software for receiving the mail transmitted from the management apparatus 20, periodically inquires a mail server (not shown) and receives accumulated mails. If the received mails include a mail on the state of the image forming apparatus 10 transmitted from the management apparatus 20, the maintenance server 30 carries out the sending preparations of supplements and the access arrangements of a maintainer.

Figure 2:
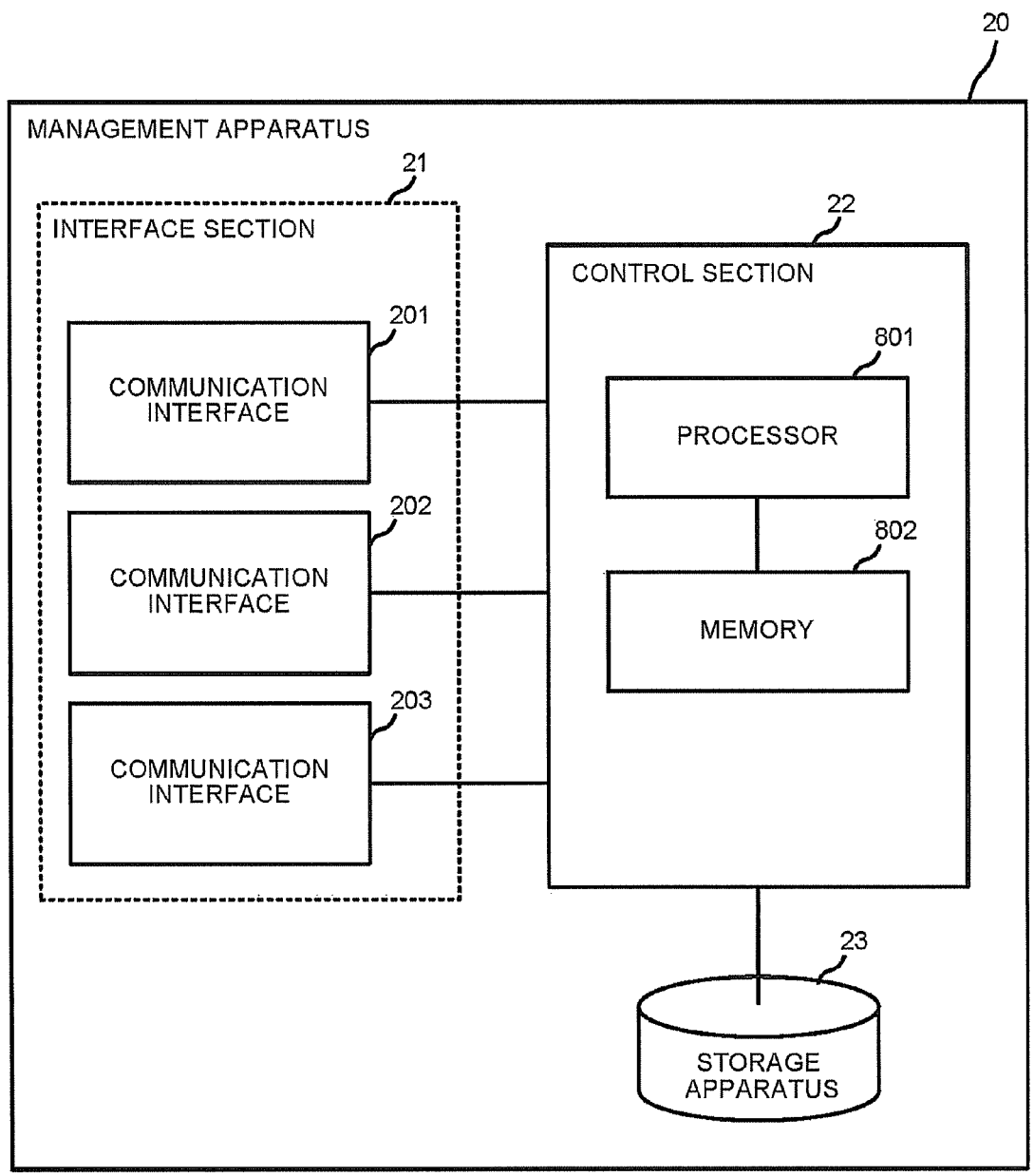
FIG. 2 is a block diagram illustrating an example of the configuration of a management apparatus.

An example of the configuration of the management apparatus 20 is described here with reference to the block diagram shown in FIG. 2. In this example, the management apparatus 20 is a computer and comprises an interface section 21, a control section 22 and a storage apparatus 23.

The interface section 21 has three communication interfaces 201-203 in this example. The communication interface 201 is, for example, a network board based on conventional Ethernet standards. The communication interfaces 202 and 203 are the same. The interfaces are connected with the LAN cable and assumed to carry out wired communication, may also be assumed to which carry out wireless communication. Further, the interface section 21 is sometimes called as interface for short.

The communication interface 201 is a unit for receiving the alert transmitted from the image forming apparatus 10. The communication interface 202 is a unit for transmitting a state inquiry telegram to the image forming apparatus 10 and receiving a result. The communication interface 203 is a unit for transmitting the mail towards the maintenance server 30 to the outside. The aforementioned three boards are arranged in this example, however, one board may be shared to achieve communication with the image forming apparatus 10. Further, it may also be configured as which carries out all communication with one board.

The control section 22 is the board (mother board) for controlling each piece of hardware of the management apparatus 20 and at least comprises a processor 801 and a memory 802. The processor 801, which is an arithmetic apparatus such as a CPU (Central Processing Unit), downloads the program stored in the storage apparatus 23 or the memory 802 in advance and executes an operation in accordance with the program, thereby controlling each piece of hardware. The memory 802, which is, for example, a semiconductor memory, comprises a ROM (Read Only Memory) for storing various control programs and a RAM (Random Access Memory) for providing a temporary working area for the processor.

The storage apparatus 23 is an auxiliary storage apparatus for storing data or programs permanently. The storage apparatus 23, which is an HDD (Hard Disk Drive) in this example, can be any storage apparatus such as a Flash SSD (Solid State Drive) that can store a high-capacity of data in a nonvolatile manner.

The operation example is described according to the embodiments. In the description, the check on the amount of the rest toner is described as an example.

The image forming apparatus 10 confirms its own toner amount and transmits an alert to the management apparatus 20 once the amount of the toner is below a given value. The image forming apparatus 10 transmits alerts to the management apparatus 20 periodically or every time an activation operation such as the switch-on of the power supply or an event is conducted.

The management apparatus 20 automatically creates a telegram for confirming the amount of the rest toner on the image forming apparatus 10 at given intervals and transmits the telegram to the image forming apparatus 10, thereby acquiring the amount of the rest toner of the image forming apparatus 10. Further, the management apparatus 20 accepts alert information from the image forming apparatus 10. There is a case where the management apparatus 20 acquires the data on the amount of the rest toner from the image forming apparatus 10 as a spontaneous action in the way above and a case where the management apparatus 20 acquires the data on the amount of the rest toner transmitted from the image forming apparatus 10 as a spontaneous action. The two operations are described with reference to FIG. 3 and FIG. 4.

Figure 3:
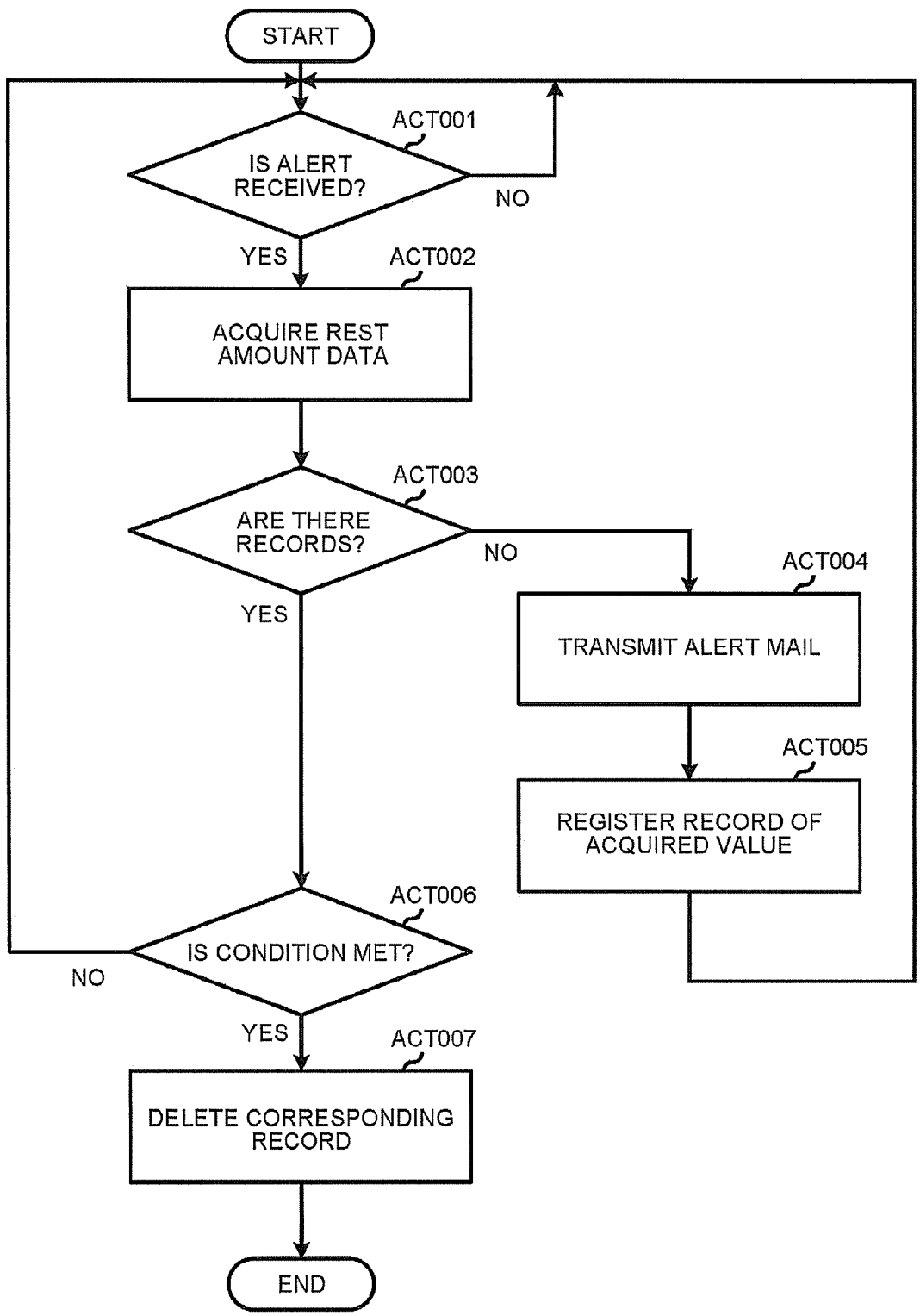
FIG. 3 is a flowchart illustrating an example of the operations conducted by a management apparatus when receiving an alert trap.

FIG. 3 is a flowchart illustrating an example of the operations when the management apparatus 20 receives an alert. The flowchart is achieved by the processor 801 by executing and operating the program installed in the storage apparatus 23 in advance.

The control section 22 determines whether or not the communication interface 201 received an alert (ACT 001). Once the management apparatus 20 is powered on, the control section 22 generates a standby-oriented socket (a socket on carrying out socket communication) for waiting for an alert. Once the control section 22 accepts a connection request from the image forming apparatus 10, the control section 22 generates another socket different from the waiting socket and receives the alert with the socket. In this manner, an alert can be received while waiting state is maintained.

Once the control section 22 receives the alert (Yes in ACT 001), the control section 22 transmits a state inquiry telegram and receives the data of the result thereof (refer here to as the rest amount data) (ACT 002). In ACT 002, the control section 22 analyzes the received alert and determines from which apparatus the alert is transmitted. The control section 22 creates a state inquiry telegram and transmits the telegram to the determined image forming apparatus 10 via the communication interface 202. The control section 22 temporarily stores the acquired data as an inquiry result in the memory 802.

The following information, is contained in the inquiry result, and is temporarily stored in the memory 802:

Time information

Identification information on the managed object device

Error code

Information for identifying the color of a corresponding toner

The rest amount (e.g. the proportion with respect to 100% in a fully supplemented state)

The identification information on the managed object device refers here to the identification information on the image forming apparatus 10. The error code, which is a code representing the state of the image forming apparatus 10, refers here to a code value representing that the amount of the rest toner is below a given value. In addition, it may also be set that ACT 002 is not conducted if the aforementioned items are all contained in the alert telegram received in ACT 001. In addition, it may also be set that if the aforementioned items are partially acquired in the alert telegram received in ACT 001, and the rest information is acquired in ACT 002.

The control section 22 determines whether or not the records in the storage device 23 include records concerning the same content (ACT 003). The determination is described below in detail. If there are no records concerning the same content (No in ACT 003), the control section 22 creates email data to be transmitted and transmits the email telegram via the communication interface 203 (ACT 004). The control section 22 stores the acquired information (from the aforementioned time information to the aforementioned rest amount information) conducted until ACT 002 in the storage apparatus 23 in an associated manner (ACT 005). Then, a record is registered in the storage apparatus 23.

The processing returns to ACT 001. When received an alert (Yes in ACT 001), the control section 22 transmits an inquiry telegram and acquires all the aforementioned information including from the time information to the rest amount information (ACT 002).

Then, the control section 22 determines whether or not the same information is registered in the storage apparatus 23 (ACT 003). In this example, the control section 22 determines whether or not the following information is all consistent and whether or not there are the same records. Additionally, the aforementioned initial ACT 003 is the same.

Identification information on the managed object device
Error code
Information for identifying the color of a corresponding toner If the information is all consistent, the control section 22 determines that the same records are registered. Otherwise, if there is at least one inconsistent information, the control section 22 determines that the alert is an alert concerning different content. If the image forming apparatus to conduct a transmitting action is different, the control section 22 determines that the alert to be a different alert even if the color of the toner is the same. Further, an alert on the insufficiency of the rest toner in a different color determined to be a different alert if the alert is transmitted from one image forming apparatus.

In the case where there are no the same records registered (No in ACT 003), the control section 22 carries out ACT 004 and ACT 005 in the way above. On the other hand, in the case where there are the same records registered (Yes in ACT 003), the control section 22 determines whether or not a condition is met (ACT 006). The determination refers here to a determination on whether or not the alert on the insufficiency of the rest amount is released. The control section 22 compares the rest amount value registered in the record in the storage apparatus 23 with that acquired in ACT 002 or determines whether or not the rest amount value acquired in ACT 002 is above a given value.

If the condition is met (Yes in ACT 006), the record is deleted or logically deleted (ACT 007). If the condition is not met (No in ACT 006), the flow returns to ACT 001. Further, the data used or a trigger compared in ACT 006 can be set by the user.

The operations of the flowchart shown in FIG. 3 are conducted repeatedly until the power supply of the management apparatus 20 is cut off.

Figure 4:
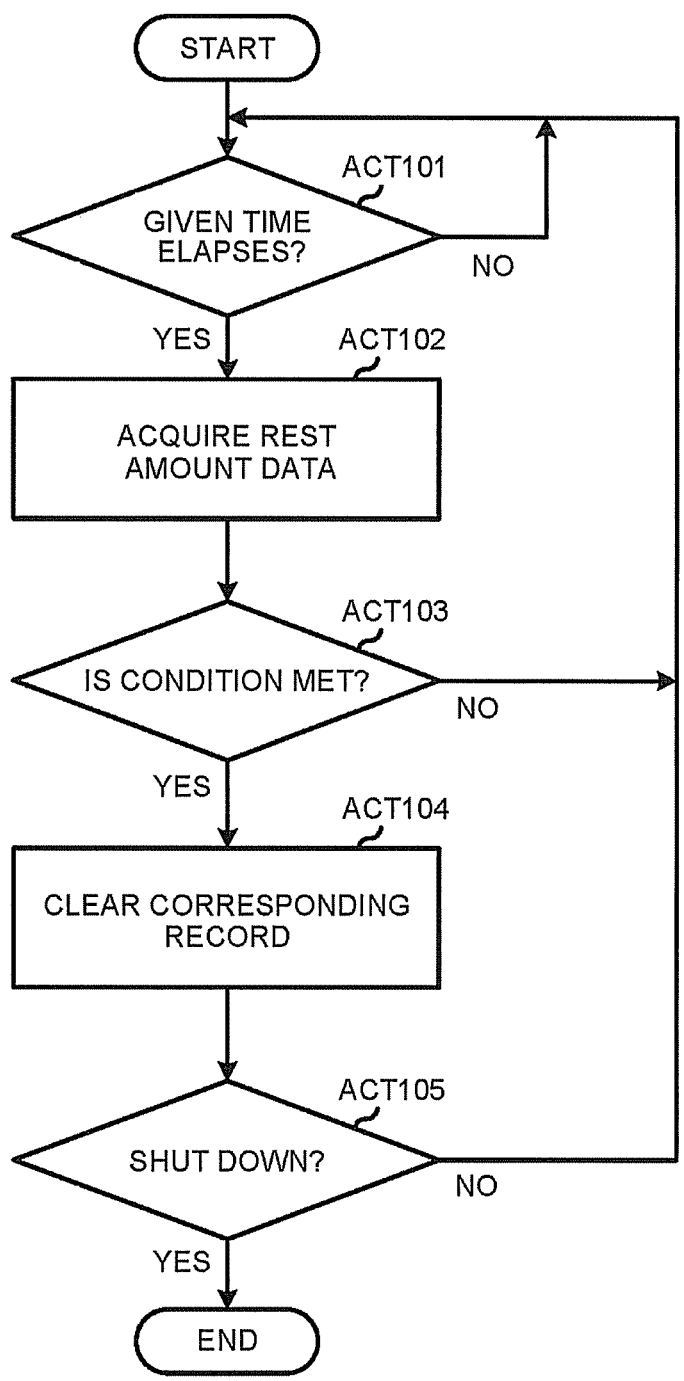
FIG. 4 is a flowchart illustrating an example of a management apparatus when transmitting a state inquiry telegram by itself.

The operations shown in FIG. 3 are operations when receives an alert trap. However, apart from these operations, the management apparatus 20 further periodically transmits a state inquiry telegram to the image forming apparatus 10 and receives the result thereof. The operations conducted at this time are shown in FIG. 4. The operations shown in FIG. 4 are achieved by the processor 801 by executing and operating the program installed in the storage apparatus 23 in advance. In addition, the operations shown in FIG. 3 and FIG. 4 are conducted in parallel and asynchronously.

The control section 22 determines whether or not a given time elapses (ACT 101) and stands by to wait for the operations shown in FIG. 4 until a given time elapses (loop of No in ACT 101). The given time, which is, for example, 1 min or 5 min, is predefined and can be designated by the user. If the given time elapses (Yes in ACT 101), the control section 22 transmits a state inquiry telegram about the image forming apparatus 10 via the communication interface 202. In this way, the control section 22 acquires the current state information of the image forming apparatus 10 (ACT 102). Similar to that in ACT 002 shown in FIG. 3, the obtained information in this operation contains the items the same as those in acquired information in ACT 002.

The control section 22 determines whether or not a condition is met (ACT 103). The determination is similar to that made in ACT 006 shown in FIG. 3. If the condition is not met (No in ACT 103), the flow returns to ACT 101. On the other hand, in the case where the condition is met (Yes in ACT 103), if there is a corresponding record in the storage apparatus 23, then the record is deleted or logically deleted (ACT 104). The determination on whether or not there is a corresponding record is the same as that made in ACT 003 shown in FIG. 3.

The operations in ACT 101-ACT 104 are conducted repeatedly until the power supply of the management apparatus 20 is cut off (Loop of No in ACT 105).

Further, an installation that ACT 002-ACT 007 shown in FIG. 3 may be carried out instead of carrying out ACT 102-ACT 104 shown in FIG. 4. That is, in the case where there are the same records, the control section 22 transmits no alert mail to the maintenance server 30. In the case where there are no the same records, the control section 22 transmits an alert mail.

Further, it can also be considered that an alert concerning the content is no longer transmitted after the amount of the rest toner is recovered through a maintenance operation. In this case, the operations shown in FIG. 3 became a standby state as that in ACT 001, and a corresponding record may not be deleted by the operations shown in FIG. 3 only. However, the record can be deleted by executing the operations shown in FIG. 4 in parallel. Further, it may also be set that the image forming apparatus 10 transmits an alert when recovered, then, a corresponding record may be deleted only by the actions shown in FIG. 3.

The aforementioned embodiment can be applied in the case of a jam or fault. In the case of a jam or fault, such alerts as those shown below are transmitted from the image forming apparatus 10. Alternatively, alerts may be obtained when a state inquiry telegram is transmitted.

Time information
Identification information on the managed object device
Error code
Information for identifying the location where a jam (fault) occurs In this case, the control section 22 of the management apparatus 20 can distinguish a jam from a fault according to an error code. Further, in the case of a fault, by further sub-classifying the system of the error codes, the control section 22 can determine the content of a fault. The control section 22 determines whether or not there are all consistent records containing the identification information of the managed object device, the error code, the information for identifying the location where the jam (fault) occurs (ACT 003). If there are no such records, an alert mail is transmitted (ACT 004), and if there are such records, no alert mail is transmitted (refer to the flow after Yes in ACT 003).

Further, the aforementioned embodiment is applicable as well in the case of a high resource utilization rate. In the case of a high load, the following alert or inquiry result is transmitted from the image forming apparatus 10.

Time information
Identification information on the managed object device
Error code Information for identifying the part where a high load is generated Utilization rate (%)

In this case, the control section 22 of the management apparatus 20 determines whether or not there are all consistent records containing the identification information of the image forming apparatus 10, the error code, the information for identifying the location where the high load is generated (ACT 003). If there are no such records, the control section 22 transmits an alert mail (ACT 004), and if there are such records registered, no alert mail is transmitted (refer to the flow after Yes in ACT 003). The control section 22 carries out the determination of ACT 006 with the utilization rate (%).

In the case where sheets are run out, the following information are obtained until ACT 002 is conducted:

Time information

Identification information on the managed object device

Error code

Identification information for confirming a cassette

Here, the processing procedure is the same as that described above. That is, the control section 22 determines whether or not there is a registered record based on the identification information on the managed object device, the error code and the identification information for determining a cassette, transmits an alert mail if there is no record registered, and transmits no alert mail if there is a record registered.

The description is given in the aforementioned embodiment by taking an image forming apparatus as a managed object device, however, a POS (Point of Sale) terminal or the computer of a server may also be taken as the object managed. Further, the aforementioned embodiment may be applied to the supplementation of a consumable in a POS terminal.

In the example above, the notification system 100 transmits an alert trap and the result data of a state inquiry telegram in an independent format, for example, an application with the conventional SNMP (Simple Network Management Protocol) may be applicable as well. In this case, a management information base (MIB) may be provided, if needed.

As stated above, the technology recorded herein is capable of preventing the notification of the same notice to the outside and decreasing traffic.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A management apparatus, comprising:
   a memory configured to store alert information;
   an interface configured to receive the alert information transmitted from a device if the device determined itself to be in a first state where resource utilization rate of a part of the device is more than a given standard; and
   a control section configured to carry out no notice on the first state of the device to an external apparatus if first information representing a state the same as the state represented by the alert information is contained in the memory, and store the first information in the memory based on the alert information and carry out the notice to the external apparatus if the first information is not contained in the memory.

2. The management apparatus according to claim 1, wherein the control section deletes the first information stored in the memory if the device is recovered from the first state.

3. The management apparatus according to claim 2, wherein
   the control section periodically creates a telegram for inquiring about the state of the device;
   the interface periodically transmits the telegram to the device and receives the state information on the device from the device; and
   the control section periodically deletes the first information stored in the memory if the value contained in the state information is a value representing a recovery from the first state.

4. The management apparatus according to claim 3, wherein
   in the case where the interface receives the alert information;
   the control section creates a telegram for inquiring about the state of the device;
   the interface transmits the telegram to the device and receives the state information on the device from the device; and
   the control section determines whether or not there is first information representing the same state by determining whether or not the information contained in the state information is consistent with that stored in the memory.

5. The management apparatus according to claim 1, wherein
   the interface receives the alert information from an image forming apparatus.

6. A notification method for a management apparatus, comprising:
   receiving alert information transmitted from a device if the device determined itself to be in a first state where resource utilization rate of a part of the device is more than a given standard; and
   carrying out no notice on the first state of the device to an external apparatus if first information representing a state the same as the state represented by the alert information is contained in a memory, and storing the first information in the memory based on the alert information and carrying out the notice to the external apparatus if the first information is not contained in the memory.

7. The notification method according to claim 6, wherein the management apparatus deletes the first information stored in the memory if the device is recovered from the first state.

8. The notification method according to claim 7, wherein the management apparatus creates a telegram for inquiring about the state of the device periodically, transmits the telegram to the device periodically, receives the state information on the device from the device periodically and deletes the first information stored in the memory if the value contained in the state information is a value representing a recovery from the first state periodically at a predetermined cycle.

* * * * *